United States Patent [19]

Kaes

[11] Patent Number: 5,853,610
[45] Date of Patent: Dec. 29, 1998

[54] ANTIFREEZE AND DE-ICING AGENT, ESPECIALLY FOR THE DE-ICING OF SURFACES

[75] Inventor: Gertrude Kaes, Vienna, Austria

[73] Assignee: Lang & Co. Chemisch-Technische Produkte Kommanditgesellschaft, Mauerbach/Wien, Austria

[21] Appl. No.: 918,243

[22] Filed: Aug. 25, 1997

[30] Foreign Application Priority Data

Aug. 26, 1996 [AT] Austria ................................. A1521/96

[51] Int. Cl.$^6$ ................................. C09K 3/18; C09K 5/00
[52] U.S. Cl. ........................... 252/70; 106/13; 106/14.21; 252/71
[58] Field of Search ................... 106/13, 14.21; 252/70, 71

[56] References Cited

U.S. PATENT DOCUMENTS

| | | | |
|---|---|---|---|
| 4,292,190 | 9/1981 | Davis et al. | 106/14.15 |
| 4,358,389 | 11/1982 | Konig-Lumer et al. | 106/13 |
| 4,402,847 | 9/1983 | Wilson et al. | 106/14.12 |
| 4,448,919 | 5/1984 | Murase | 524/394 |
| 4,450,088 | 5/1984 | Wilson et al. | 252/75 |
| 4,452,715 | 6/1984 | Hirozawa | 252/75 |
| 4,636,324 | 1/1987 | Murase et al. | 252/70 |
| 4,664,832 | 5/1987 | Sandvig et al. | 252/70 |
| 5,076,951 | 12/1991 | Miles et al. | 252/79 |
| 5,085,791 | 2/1992 | Burns | 252/79 |
| 5,085,793 | 2/1992 | Burns et al. | 252/79 |
| 5,395,658 | 3/1995 | Jaklin | 252/70 |
| 5,651,916 | 7/1997 | Weir | 252/74 |

OTHER PUBLICATIONS

Chemical Abstract No. 125:256698 which is an abstract of Japanese Patent Specification No. 08–206471, Aug. 1996.
WPIDS Abstract No. 85–230211 which is an abstract of Switzerland Patent Specification No. 651059, Aug. 1985.
WPIDS Abstract No. 91–165288 which is an abstract of German Patent Specification No. 4034217, May 1991.

*Primary Examiner*—Anthony Green
*Attorney, Agent, or Firm*—Herbert Dubno

[57] ABSTRACT

An antifreeze and de-icing system containing a freezing point lowering chlorine containing inorganic substance like NaCl, $MgCl_2$ or $CaCl_2$ and admixed with the substance, a mixture of potassium carbonate and water soluble alkali silicate.

16 Claims, No Drawings

ANTIFREEZE AND DE-ICING AGENT, ESPECIALLY FOR THE DE-ICING OF SURFACES

My present invention relates to an antifreeze and de-icing agent containing a freezing-point-lowering substance, especially an inorganic chlorine containing substance, as the defrosting substance. The invention also relates to an additive to an antifreeze and de-icing agent and to a method of protecting surfaces from icing up or for the de-icing of the surfaces using especially chlorine-containing defrosting substances which are applied in a wet application.

BACKGROUND OF THE INVENTION

Antifreeze and de-icing agents are widely used to remove ice from or prevent the formation of ice upon pavement surfaces, roadways, airport runways and like travelled ways, as well as from air foil and other surfaces of aircraft to prevent the accumulation of ice thereof prior to take off or the like. The present invention provides an antifreeze and de-icing agent which is also useful for these purposes.

Anti-freeze and de-icing agents in general are utilized to lower the freezing point of aqueous systems to, on the one hand, prevent the formation of solid ice and, on the other hand, melt or dissolve already formed ice. The antifreeze and de-icing agents which have been used heretofore can include inorganic salts such as sodium chloride, magnesium chloride calcium chloride, potassium phosphate, sodium phosphate, ammonium phosphate, ammonium nitrate, alkaline-earth nitrates, magnesium nitrate, ammonium sulphate, alkali sulphates and such organic compounds as low molecular weight alcohols, glycols, lactates or even urea.

Apart from the freezing point lowering effects of such substances in water, the use of antifreeze and de-icing agents must take into consideration the corrosivity of the agent on different materials as well as the environmental effects of such substances. The least expensive and most widely used antifreeze and de-icing agents have been sodium chloride or calcium or magnesium chloride or mixtures thereof. However, because of the chlorine content of such substances, when they are brought into aqueous solutions, significant corrosion can be observed on ferrous metal or other metal surfaces, concrete and masonry. The substances are also detrimental to plants.

The chlorine content in spread-salt or aqueous solution applications of such chlorine containing freezing point lowering compounds is known to hinder the water take up by the roots of trees and lower plants. Furthermore, the chloride tends to find its way into the leaves of such plants and to damage them. The leaves tend to brown inwardly from the edges and prematurely fall off. With rain and melting snow, the chloride from the fallen leaves tends to be washed out and the chloride cycle which is so detrimental for plants, begins anew. As a consequence, there is a continuous accumulation of chloride in the soil.

The sodium component of this accumulation in the soil tends to promote silting and layering and compaction of the soil. However, the correlation between the degree of this detrimental effect on the soil and the sodium content is less pronounced then the detrimental effects previously described and the demonstrated detriment which is associated with the sodium/potassium ratio.

Like nitrogen and phosphorous, potassium can be considered one of the thirteen essential elements required for plant nutrition. Potassium however does not bring about as pronounced a tendency toward eutrophication as other element since it normally is not the limiting elements in any event.

German Patent Document DE-OS 29 33 318 describes the use of sodium and potassium chloride in combination with CaO, $CaCO_3$, MgO and $MgCO_3$. In this system, large amounts of detrimental chloride apart from insoluble proportions of line and dolomite are present.

Many publications are concerned with reducing corrosion of spread salts, especially NaCl, by the addition, for example, of cyanamide in an amount of 0.1 to 10% (see German Patent Document 28 47 350), the cyanmide tending to reduce metal corrosion. However, it does not have a significant capability of reducing the detrimental effect of NaCl on plants, animals or building materials.

Because of the aforedescribed problems with chloride containing antifreeze and de-icing agents, it has long been sought to include other products with the antifreeze and de-icing agents such as ammonium sulphate, urea and sodium nitrate. Such mixtures with different corrosion inhibitors have been disclosed in German Patent Document 29 80 620, as well as AR Patent 191 383.

Ammonium salts which have the effect of lowering the freeing point temperature of water and can be used as a de-icing agent can, however, attack concrete, masonry and other calcium containing building materials like concrete roadways, runways, culverts and the like when the antifreeze and de-icing agent is not reacted with or combined with inhibitors and other protective agents.

Sulphates without appropriate additives tend to react with the tricalcium aluminate of cements to form ettrigite which leads to an increase in volume and hence ablation and cracking.

The use of organic antifreeze and de-icing agents can reduce the danger of corrosion since many organic compounds are significantly less aggressive with respect to surfaces of different materials and can be more readily combined with corrosion inhibitors especially with respect to metals. However, organic compounds are significantly more expensive than the freezing point lowering inorganics and simply are not as economical. Furthermore with many products there is a problem of environmental pollution.

OBJECTS OF THE INVENTION

It is, therefore, an object of the invention to provide an antifreeze and de-icing agent which will be less corrosive or aggressive with respect to concrete and metallic materials and which will enable for a given antifreeze and de-icing action, the amount of the freezing point lower or defrosting substances, which can be a chlorine-containing inorganic substance to be significantly reduced, thereby minimizing the environmental effect and in addition providing an improved potassium/sodium ratio which has been found to be highly important for plant growth.

Another object of the invention is to provide an improved additive to a chlorine containing freezing point lowering defrosting substance to improve the efficiency of an antifreeze and de-icing agent containing same.

Still another object of the invention is to provide an improved method of de-icing a surface or preventing ice formation on a surface.

SUMMARY OF THE INVENTION

These objects and others which will become apparent hereinafter are attained, in accordance with the invention, in an antifreeze and de-icing agent which contains, as an additive to at least one inorganic chlorine-containing compound, especially sodium chloride, a combination of potassium carbonate and at least one water soluble alkali silicate. For the wet salt application of the antifreeze and de-icing agent, the potassium carbonate and alkali silicate are combined with the inorganic chlorine containing compound in the form of an aqueous solution while the latter substance is preferably provided in pulverulent or granular form. Preferably the aqueous solution contains up to 50% weight of potassium carbonate and up to 30% by weight of alkali silicate, based upon the weight of the solution. The solution is added in an amount preferably of between 10 and 30 weight percent of the antifreeze and de-icing agent.

Alternatively, the antifreeze and de-icing agent and hence both the additive and the inorganic chlorine containing compound can be provided as a powder or granulate mixture, with the additive being present in an amount of 1 to 50% by weight of the antifreeze and de-icing agent inorganic chlorine containing compound. In the additive, the alkali silicate is preferably provided in an amount between 1 and 10% by weight with the balance up to 100% by weight being the potassium carbonate. With reference to the total weight of the antifreeze and de-icing agent over the pulverulent or granular additive can be present in an amount of 1–50% by weight and preferably the alkali silicate is sodium silicate, potassium silicate or a mixture thereof.

The additive of the invention without the inorganic, chlorine containing compound as the freezing point lowering or defrosting substance is also an invention and the invention also includes the protection of surfaces from icing up or which are de-iced by providing prior to or during the spreading operation an additive of which is admixed to the defrosting substance.

One of the reasons for developing the preferred wet salt application of the invention was the desire to minimize the amount of salt which must be spread into the environment. It is, therefore, desirable to minimize the amount of the defrosting substance spread in solubilized form on roadways or the like. With the invention, however, a still further reduction in the amount of the salt used to, say, (5 g/m$^2$) can be employed.

Higher amounts may be used, for thicker ice layers or where longer duration defrost or de-icing effects are desirable.

The system of the invention is advantageous also because the spread de-icing agent with the additive has significantly reduced losses of blown material.

The system of the invention can be applied by any wet salt spreading approach used for de-icing and anti-icing purposes with the spread salt component being wetted by a liquid phase. The addition of filters such as gravel or smaller particles is also possible.

The liquid phase can be an alkali silicate inhibited potassium carbonate solution which can be combined with the solid alkali chloride component. A combination of this type has been found to be environmentally compatible and to provide the requisite protection of mineral surfaces like those of concrete, cement and both ferrous metals and light metals (such as aluminum and magnesium alloys).

By the use of a potassium carbonate brine instead of a the more common calcium chloride or sodium chloride brines, the chloride component utilized for de-icing purposes can be significantly reduced by comparison with the more conventional systems and thus the effect of chlorides on vegetation can be reduced.

The increased potassium level in the soil has been found to be advantageous in many cases since potassium is an essential nutrient for plants and acts as a promoter of the formation of plasma colloids, activating a number of enzyme systems. Nevertheless eutrophication need not be feared since potassium generally is not a limiting element in the soil.

In order to effect wet salt spreading, the spreading vehicle can be provided with a brine reservoir and a metering device. Since practically all machine spreading vehicles are equipped with such components, the spreading of the de-icing composition is no problem.

The advantage of a wet salt spreading over other more common spreading methods can be found in the improved cover for reliability, the reduced environmental impact and the economics.

Since dust from the salts is bound by the moisture, losses are reduced, including losses which can result from accumulations of the spread material in locations which are out of the travelled way.

The wet salt application provides better adhesion of the spread product of the ground so that the duration of action on the travelled way is increased.

Because of optimal utilization of the freezing point lowering substance, the amount of material which is spread, as a whole, can be reduced and even very small quantities (e.g. less than 10 g/m$^2$) can be effectively spread.

The reserve of solid freezing point lowering substance in the moist salt ensures, apart from the surface thawing, a melting of thick ice layers via the solid salt grains which are present. Furthermore, the wetting of the salt grains ensures the reduction of blowing losses and a significantly wider spread, possibly over three lanes from a spreading machine travelling on a single lane. The range of the spreader is also because of the smaller amount of material which must be spread per unit area.

There is discussed below the effect of the salt on porous materials and the mechanisms of such effects. The effects on structural material are reduced above all by two mechanisms.

(a) Damage by lattice disruption as a result off pressure effects, for example crystallization and hydration pressure.

(b) Corrosion effects in the regions of steel reinforcement.

The pressure effects detrimental to structural materials arise from three different processes:

The crystallization pressure arises because salts normally are present in the material as more or less saturated solutions. It is known that supersaturated solutions can spontaneously arise. Since the crystallization is associated with a volume increase, a sudden increase of crystallization pressure can occur in the pores of the construction material. A supersaturation can occur as a consequence of evaporation of the water from the pores as a result of temperature phenomenon with a concomitant increase in the salt concentration. The order of magnitude of this crystallization pressure naturally depends upon the type and concentration of the salt. The consequence is the disruption of the pore structure in the material. For clarification, the pressures of the salts most likely to affect structural materials at a temperature of 0° C. and 100% super saturation are:

| | |
|---|---|
| $CaSO_4 \cdot \frac{1}{2} H_2O$ | 33.5 N · mm$^{-2}$ |
| $MgSO_4 \cdot 1 H_2O$ | 27.2 N · mm$^{-2}$ |
| NaCl | 55.4 N · mm$^{-2}$ |

The hydration pressure arises because of the tendency of most salts to pick up water of hydration in a chemical reaction. The pick up of crystal water also results in a volume increase which gives rise to a sharp jump in pressure. That also will result in destruction of the pore structure. This mechanism depends upon the amount of water which can be picked up by the salt and by the transition temperature at which water of hydration is picked up or released. Lower transition temperatures make the hydration more likely and increase the contribution from this effect. Of course NaCl which does not form a hydrate, does not participate in this mechanism. An illustration of the hydration pressure can be given for calcium sulphate (gypsum) at 0° C. and 100% relative humidity of the air.

$$CaSO_4.1/2H_2O \rightarrow CaSO_4.2H_2O\ 219\ N.mm^{-2}$$

Another pressure jump within the structure of the material can arise from so-called chemical corrosion. The chemical corrosion is a reaction like "acid rain" which leads to a transformation of salts contained in the material. Acid rain results from the combustion of petroleum products and coal containing sulphur which is oxidized initially to sulphur dioxide ($SO_2$) and then to sulphur trioxide ($SO_3$). The sulphur dioxide in atmosphere can be oxidized to sulphur trioxide by a variety of mechanisms. The sulphur trioxide is water soluble and forms in water dilute sulphuric acid.

$$S+O_2 \rightarrow SO_2$$

$$SO_2+1/2O_2 \rightarrow SO_3$$

$$SO_3+H_2O \rightarrow H_2SO_4$$

The sulphuric acid is carried by rain water or snow melt water into the capillary system of the structure where it can attack the binder and be converted into sulphate. The conversion results in a dramatic volume increase which also gives rise to a jump in internal pressure. The acid attack on the binder is illustrated by two examples below in which the volume increase in percent is given in brackets after the respective reaction equation:

$$H_2SO_4+CaCO_3+2H_2O \rightarrow CaSO_4.2H_2O+H_2O+CO_2\ (100\%)$$

$$H_2SO_4+MgCO_3+7H_2O \rightarrow MgSO_4.7H_2O+H_2O+CO_2\ (430\%)$$

When the material is concrete, the reinforcement generally contributes the flexural strength.

Because of the high alkalinity of the material of the structure (pH about 12.5–12.8) a passivating oxide layer is formed on the steel surface of the reinforcement and protects the latter against rusting. The corrosion preventing effect is limited to a pH range of about 9.5–13. By external influences like, for example, acid rain and $CO_2$ from the air, the pH value in concrete can be lowered. This process is known as carbonatization. The carbonatization reduces the concrete quality so slowly that the strength of the concrete structure can last several hundred years. This useful life can be, however, greatly reduced by penetration of chloride into the concrete and localized corrosion resulting therefrom. This corrosion is fatal to the strength of the structure and is relatively independent of the pH value.

The invention which, on the one hand, reduces the amount of material which must be spread to obtain a given de-icing effect, on the other hand can reduce the penetration of chloride into concrete and other structures and can also reduce the deterioration mechanisms which would otherwise apply. For example, if one assumes a calcium carbonate binder (for example $CaCO_3$) the deterioration mechanisms discussed above can include:

$$H_2SO_4+CaCO_3 \rightarrow CaSO_4+H_2O+CO_2$$

$$CaSO_4+1/2H_2O \rightarrow CaSO_4.1/2H_2O\ (\text{crystallization pressure 33.5 N.mm}^{-2})$$

$$CaSO_4+1/2H_2O \rightarrow CaSO_4.1/2H_2O\ (\text{hydration pressure 219 N.mm})$$

All of the deterioration mechanisms discussed above require initially that salt-containing water penetrate into or be present in pores of concrete. At this stage the de-icer of the invention plays a concrete protective affect. The alkali silicate reacts with the calcium ions of the binder to form an insoluble silicate which deposits on the surface and closes at least in part the pores to make the concrete surface practically insoluble. As a result, further penetration of the salt solution into the concrete structure is prevented or reduced in effect.

This protective mechanism resulting from the use of the de-icer of the invention will be more readily understandable from the following clarification:

Metals have the tendency, upon contact with water or solutions, to transform into a cationic state. In this mechanism, for example, a metal ion $M^1$ (Na, K, etc.) when encountering another metal ion $M^2$ (Ca, Mg, Al, etc.) in an electrolyte, engages in an ion substitution reaction. This is the case when the ionizing tendency of $M^1$ is greater than that of $M^2$.

$$M^1\ (\text{undissociated}) + M^2\ (\text{Ion}) \rightarrow M^1\ (\text{Ion}) + M^2\ (\text{undissociated}) \quad (1)$$

Normally aqueous solutions of alkali silicates react highly basically (as alkalis) as a result of hydrolysis $$M^1_2SiO_3+H_2O \rightarrow M^1_2Si_2O_5+M^1OH \quad (2)$$

Aqueous solutions of alkali silicates like $M^1_2SiO_3=M^1_2O.SiO_2$; $M^1_2Si_2O_5=M^1_2O.2SiO_2$; $M^2O$, etc. from the concrete react as shown in equation (3) with alkali silicates with the formation of $M^2$ silicates and colloidal silicic acid.

$$M^1_2Si_2O_5+M^2O+H_2O \rightarrow M^2SiO_3+SiO_2+Si(OH)_4+M^1OH \quad (3)$$

Halogen ions like $X^-$ react with $M^2$ with the formation of a complex ion $M^{2-}_{m+1}$ (whereby m is the oxidation number of the metal $M^2$). From these complex ions it will be apparent that the hydrolysis and dehydration reaction of equations 4 and 5 are accelerated $$M^2X^-_{m+1}+H_2O \rightarrow M^2\ (OH)_m+X^- \quad (4)$$

$$M^2(OH)_m+M^1_2SiO_2O_5 \rightarrow M^2Si_2O_5+M^1\ OH \quad (5)$$

After the neutralization of the silicates by $SO_3$ and or $CO_2$ from ambient air, the alkali silicates are in the form of gel-like hydrated $SiO_2/Si(OH)_4$ which deposits as a colloid and serves to close the pores. These deposited silicate layers do not, however, result in a gas tight hydrophobization of the surface.

The effect of the silicate, however, is a protection of metals against corrosion, including the metals of vehicle bodies, reinforcing steel and light metals, as well as a protection of mineral structural members such as those compared of concrete against deterioration. The alkali silicates in the liquid phase significantly inhibit the attack upon vehicle metals.

A liquid phase which is an aqueous solution of about 3–10% by weight alkali silicate ($M_2O/SiO_2$ of 1/1.0–3.9) and about 40% potassium carbonate, can represent a best mode embodiment of the invention. By contrast to hitherto conventional brines consisting primarily of $CaCl_2$ and NaCl, which can only be used to temperatures as low as −20° C. The products of the invention can be used in temperatures ranges below −30° C.

The potassium carbonate will come out of solution only below −35° C. Furthermore, to use conventional systems at temperatures as low as −20° C., a calcium chloride brine must have a concentration of at least 30% by weight $CaCl_2$. Such highly concentrated calcium chloride brines, when they are the exclusive street de-icing composition are known to reduce traction for vehicles and, in practice it has been found that the concentrations of such brines should be maintained at most at about 25% to prevent the risk that such brines will leak onto the travelled way. In practice, therefore, conventional systems cannot be used at conventional temperatures by 20° C.

SPECIFIC DESCRIPTION AND EXAMPLE

Example 1

An additive according to the invention is supplied in the liquid phase in a concentration range of 5–40% (preferably 10–30%) relative to the dry sodium chloride to the de-icing agent. The de-icing agent is applied in an amount of 15 grams of the agent of the invention per square meter of surface and to an ice layer of 1 mm thick. The composition of the melted product corresponding to about 0.18% potassium carbonate solution with a pH of about 10.27 as determined in pure water. The limited alkalinity was readily neutralized by $SO_3$ from acid rain and $CO_2$ from the air.

Example 2

To determine the effect of the product of the invention on a long term basis effect on concrete, prism-shaped concrete blanks were immersed for six months in a 3% solution of the de-icing agent of the invention in its fully dissolved state and containing sodium chloride as the freezing-point-lowering ingredient and alkali silicates as well as potassium carbonate. The test solution was replaced with fresh test solution monthly. For comparison, an additional three test blanks were immersed in pure municipal water under the same conditions. Optical evaluation of the blanks indicated after ending of the test that all edges and corners of the prisms were linear and sharp edged.

In addition, the test blanks were stored for a further month at 40° C. in a 3% solution of the de-icing agent of the invention (as already described).

After the test all edges and corners were linear and sharp and there were no cracks, ablations or cavity formations indicating deterioration.

Example 3

Concrete samples of the strength classes B 160 (corresponding to sidewalk concrete), B 300 (corresponding to roadway concrete) and B 500 (corresponding to bridge-building concrete) with dimensions of 160×40×40 mm were subjected to the following tests:

1. 28 days in a 3% solution according to the invention (in water with 10°dH) at 40° C.
2. 28 days in a 3% solution according to the invention (in water with 10°dH) with temperature cycling (8 hours at 40° C./16 hours at room temperature).
3. 28 days in water (10°dH) at 40° C.
4. 28 days in water (10°dH) with temperature cycling (8 hours at 40° C./16 hours at room temperature).

Optical review showed that the samples had no breakdown and that the edges and corners were rectilinear and sharp edged.

Test of flexural strength in accordance with Austrian Standard B 3310 (Portland Cement, Ferro Portland Cement and Blast Furnace Cement) showed on the average for all four tests and for each of the test specimens approximately the same values.

Based upon the above described tests it could also be concluded that the concrete specimens did not deteriorate with respect to the concrete surfaces or edges or with respect to flexural data.

The following tests 4–8 applied to the additive of the invention and stability tests for this additive in the absence of NaCl.

Example 4

The preparation of the additive in the liquid phase was effected by the dissolving the solid potassium carbonate in tap water and admixing about 50% alkali silicate solution therewith with slight stirring.

Example 5

Four different additives were produced in liquids phases for corrosion tests. The potassium carbonate content was a constant 40% for all of the brines. The potassium silicate content (molar ratio $K_2O/SiO_2$ equals 1/2.2) was varied as follows:

Solution 1: 4% alkali silicate solution
Solution 2: 6% alkali silicate solution
Solution 3: 8% alkali silicate solution
Solution 4: 10% alkali silicate solution

Example 6

Solution 1 was observed at 20° C. in the open for a week for possible changes. The brine however appeared to be stable over the entire period.

Example 7

Solution 1 was observed at −18° C. for a week for possible changes. The brine in this case also remains stable under these conditions for the entire period and showed no tendency to crystallization.

Example 8

Solution 1 was observed at −40° C. for 12 hours for its crystallization characteristics and remained unchanged over the entire period.

Example 9

Solutions 2–4 were processed analogously to examples 6–8 and no changes of the respective liquid phase were observed.

Example 10

The test solutions were made up with 3% solutions of common salt (NaCl) with different concentrations of potassium carbonate and alkali silicate and tested against the 3% common salt solution without the additive.

Tests utilizing simulated rain water of a pH of 5.5 containing traces of ($Cl^-$, $SO_4^{2-}$, $Ca^{2+}$, $H^+$ and $NH_4^+$). The criteria for evaluation of the protective function was weight loss or increase in mg/per unit area (100 $cm^2$ with time).

The following compositions with or without additive were made up:

a) 3% common salt in simulated rain water
b) 3% common salt plus 1% additive 0 in simulated rain water
c) 3% common salt plus 1% additive 6 in simulated rain water
d) 3% common salt plus 1% additive 10 in simulated rain water Additive 0 equals 44% $K_2CO_3$
56% $H_2O$
Additive 6 equals 40% $K_2CO_3$
6% $K_2O/SiO_2$=1/2.2 (solution)
54% $H_2O$
Additive 10 equals 40% $K_2CO_3$
10% $K_2O/SiO_2$=1/2.2 (solution)
50% $H_2O$ Corrosion of iron sheet:

Test solution a): The test specimen showed a weight reduction which was substantially linear over time:

22 h: −9.03 mg/100 $cm^2$
47 h: −16.38 mg/100 $cm^2$
90 h: −26.00 mg/100 $cm^2$
120 h: −32.24 mg/100 $cm^2$
193 h: −50.40 mg/100 $cm^2$

Test Solution b): Development of a corrosion layer after only about 10 hours and which remained constant up to about 50 after commencement of the test and then sharply increased:

22 h: +5.00 mg/100 $cm^2$
47 h: +6.15 mg/100 $cm^2$
90 h: +15.45 mg/100 $cm^2$
120 h: +23.00 mg/100 $cm^2$
193 h: +50.00 mg/100 $cm^2$

Test Solution c):
No appearance of corrosion
Until about 50 hours after the start of the test, whereupon blooming occurred on the metal surfaces which had no appearance of corrosion:

22 h: +0.21 mg/100 $cm^2$
47 h: −1.40 mg/100 $cm^2$
90 h: +6.50 mg/100 $cm^2$
120 h: +18.46 mg/100 $cm^2$
193 h: +54.43 mg/100 $cm^2$

Test Solution d): Light corrosion began as in Test Solution C after 30 hours.

22 h: −0.21 mg/100 $cm^2$
47 h: +5.46 mg/100 $cm^2$
90 h: +13.85 mg/100 $cm^2$
120 h: +26.00 mg/100 $cm^2$
193 h: +67.62 mg/100 $cm^2$

Corrosion of aluminum sheet;

The test solutions a), c) and d) showed no initiation of corrosion in the observation period. This appears to be due to the development of a passivating layer of aluminum oxide ($xnH_2O$) or the inability to attack the aluminum oxide layer which may be present on the aluminum sheet.

Test Solution b): Immediate commencement of a progressive dissolution of aluminum which only after about 25 hours is brought to standstill by a protective passivating layer and apparently is due to the consumption of the solubilizing agent:

22 h: −101 mg/100 $cm^2$
47 h: −87 mg/100 $cm^2$
90 h: −79 mg/100 $cm^2$
120 h: −75 mg/100 $cm^2$
193 h: −71 mg/100 $cm^2$

The weight increase with iron sheet corrosion tests with solutions b), c) and d) can be explained by the formation of a protective layer. This protective layer appears to consists of iron-silicon carbonates.

Further examples of the additive in the form of a liquid phase:

Example 11

40% $K_2CO_3$
10% $K_2O/SiO_2$=1/1.0 (solution)
50% tap water.

Example 12

35% $K_2CO_3$
6% $K_2O/SiO_2$=1/3.2 (solution)
59% tap water.

Example 13

40% $K_2CO_3$
10% $K_2O/SiO_2$=1/3.9 (solution)
50% tap water.

Example 14

40% $K_2CO_3$
6% $Na_2O/SiO_2$=1/1.0 (solution)
54% tap water.

Example 15

30% $K_2CO_3$
3% $Na_2O/SiO_2$=1/2.0 (solution)
67% tap water

Example 16

35% $K_2CO_3$
6% $Na_2O/SiO_2$=1/3.3 (solution)
59% tap water.

In the following examples several pulverulent proportions of the de-icing and antifreeze agent are described.

Example 17

Formation of a potassium carbonate, sodium silicate mixture. The addition of solid sodium silicate is effected in a concentration range of 1–10 ($Na_2O/Si_2$—1/1 to 1/3.3).

Example 18

50% Potassium carbonate/sodium silicate mixture (see example 17)
50% NaCl.

Example 19

30% potassium carbonate/sodium silicate mixture (see example 17) 70% NaCl.

Example 20

10% Potassium carbonate/sodium silicate mixture (see EXAMPLE 17) 90% NaCl.

Example 21

1% Potassium carbonate/sodium silicate mixture (see EXAMPLE 17) 99% NaCl.

I claim:

1. An antifreeze and deicing agent, which consists essentially of:
   (a) at least one inorganic chloride selected from the group consisting of sodium chloride, calcium chloride and magnesium chloride as a freezing point-lowering defrosting substance; and
   (b) an additive to said freezing point-lowering reducing substance, said additive consisting essentially of a mixture of potassium carbonate and at least one water soluble alkali silicate wherein the alkali silicate amounts to 1 to 10% by weight of the additive with the balance potassium carbonate, and wherein the additive is present in an amount of 1 to 50% by weight of the antifreeze and deicing agent.

2. The antifreeze and de-icing agent defined in claim 1 wherein said additive and said inorganic chloride are present in said agent in powder or granular form.

3. The antifreeze and de-icing agent defined in claim 1 wherein said alkali silicate has the composition $M_2O/SiO_2$ with a molar ratio of $M_2O$ to $SiO_2$ of 1:1 to 1:3.3 where M=Na and of 1:1 to 1:3.9 when M=K.

4. The antifreeze and de-icing agent defined in claim 1 wherein said alkali silicate is a sodium silicate or a potassium silicate.

5. An antifreeze and de-icing agent for wet application, which consists essentially of:
   (a) at least one inorganic chloride selected from the group consisting of sodium chloride, calcium chloride and magnesium chloride as a freezing point-lowering substance; and
   (b) an additive to said freezing point-lowering substance, said additive consisting essentially of an aqueous solution containing 40 to 50% by weight potassium carbonate and 3 to 10% by weight of alkali silicate, based upon the weight of the solution, and wherein the additive is present in an amount of 5 to 40% by weight of the antifreeze and de-icing agent.

6. The antifreeze and de-icing agent for wet application defined in claim 5 wherein said additive is present in said agent in an amount of 10 to 30% by weight.

7. The antifreeze and de-icing agent for wet application defined in claim 5 wherein said alkali silicate has the composition $M_2O/SiO_2$ with a molar ratio of $M_2O$ to $SiO_2$ of 1:1 to 1:3.3 where M=Na and of 1:1 to 1:3.9 when M=K.

8. The antifreeze and de-icing agent for wet application defined in claim 5 wherein said alkali silicate is a sodium silicate or a potassium silicate.

9. An additive to an inorganic chloride freezing point lowering defrosting substance, said additive consisting essentially of a mixture of potassium carbonate and at least one water soluble alkali silicate wherein the alkali silicate amounts to 1 to 10% by weight of the additive with the balance potassium carbonate.

10. The additive defined in claim 9 wherein said alkali silicate has the composition $M_2O/SiO_2$ with a molar ratio of $M_2O$ to $SiO_2$ of 1:1 to 1:3.3 where M=Na and of 1:1 to 1:3.9 when M=K.

11. The additive defined in claim 9 wherein said alkali silicate is a sodium silicate or a potassium silicate.

12. An additive to an inorganic chloride freezing point-lowering reducing substance, said additive consisting essentially of an aqueous solution containing 40 to 50% by weight potassium carbonate and 3 to 10% by weight of alkali silicate, based upon the weight of the solution.

13. An additive defined in claim 12 wherein said alkali silicate has the composition $M_2O/SiO_2$ with a molar ratio of $M_2O$ to $SiO_2$ of 1:1 to 1:3.3 where M=Na and of 1:1 to 1:3.9 when M=K.

14. The additive defined in claim 12 wherein said alkali silicate is a sodium silicate or a potassium silicate.

15. A method of de-icing a surface or preventing ice formation on a surface, comprising:
   admixing with a freezing-point lowering defrosting substance in the form of at least one inorganic chloride selected from the group consisting of sodium chloride, calcium chloride and magnesium chloride, an additive consisting essentially of a mixture of potassium carbonate and at least one water soluble alkali silicate wherein the alkali silicate amounts to 1 to 10% by weight of the additive with the balance potassium carbonate; and
   depositing said inorganic chloride and said additive in a wet application on said surface.

16. A method of de-icing a surface or preventing ice formation on a surface, comprising:
   admixing with a freezing-point lowering defrosting substance in the form of at least one inorganic chloride selected from the group consisting of sodium chloride, calcium chloride and magnesium chloride, an additive consisting essentially of an aqueous solution containing 40 to 50% by weight potassium carbonate and 3 to 10% by weight of alkali silicate, based upon the weight of the solution; and
   depositing said inorganic chloride and said additive in a wet application on said surface.

* * * * *